US011493020B2

(12) United States Patent
Watanabe et al.

(10) Patent No.: US 11,493,020 B2
(45) Date of Patent: Nov. 8, 2022

(54) WIND TURBINE BLADE AND METHOD FOR MANUFACTURING THE SAME

(71) Applicant: MITSUBISHI HEAVY INDUSTRIES, LTD., Tokyo (JP)

(72) Inventors: Naota Watanabe, Tokyo (JP); Masaaki Shibata, Tokyo (JP); Toshikazu Shigetomi, Tokyo (JP); Hiroaki Takeuchi, Tokyo (JP); Atsushi Yuge, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 232 days.

(21) Appl. No.: 16/681,871

(22) Filed: Nov. 13, 2019

(65) Prior Publication Data

US 2020/0158078 A1   May 21, 2020

(30) Foreign Application Priority Data

Nov. 16, 2018  (JP) .............................. JP2018-215617

(51) Int. Cl.
*F03D 1/06* (2006.01)
*C23C 4/134* (2016.01)
*F03D 13/00* (2016.01)

(52) U.S. Cl.
CPC ............ *F03D 1/0675* (2013.01); *C23C 4/134* (2016.01); *F03D 13/00* (2016.05)

(58) Field of Classification Search
CPC ....... F03D 1/0675; F03D 13/00; C23C 4/134; C23C 30/00; C23C 4/04; C23C 4/00; C23C 28/00; C23C 28/02; C23C 28/04; C23C 28/30; F05B 2280/6011; F05B 2280/2004; F05B 2280/1074; F05B 2230/90

See application file for complete search history.

(56) References Cited

U.S. PATENT DOCUMENTS

| | | | |
|---|---|---|---|
| 2008/0254227 | A1 | 10/2008 | Stoltenhoff et al. |
| 2011/0142678 | A1 | 6/2011 | Santiago et al. |
| 2011/0256414 | A1 | 10/2011 | Knepper et al. |
| 2011/0287239 | A1 | 11/2011 | Nardi et al. |
| 2014/0093378 | A1 | 4/2014 | Clavette et al. |
| 2015/0030458 | A1 | 1/2015 | Nissen |
| 2016/0130705 | A1 | 5/2016 | Nardi et al. |

(Continued)

FOREIGN PATENT DOCUMENTS

| | | |
|---|---|---|
| CN | 102027150 A | 4/2011 |
| CN | 105673361 A | 6/2016 |
| EP | 2868920 A1 | 5/2015 |

(Continued)

OTHER PUBLICATIONS

Office Action for Taiwan Application No. 108140183 dated Jul. 9, 2020; 16pp.

(Continued)

*Primary Examiner* — Moshe Wilensky
(74) *Attorney, Agent, or Firm* — Kanesaka Berner and Partners LLP

(57) ABSTRACT

A wind turbine blade includes a base member formed of FRP and having a blade shape, an intermediate layer arranged on the base member and formed of metal, cermet, ceramic, or a mixture of at least one thereof and resin as a major constituent, and an erosion-resistant overcoat arranged on the intermediate layer and formed of a spray film having a porosity of 5% or lower.

13 Claims, 11 Drawing Sheets

(56) References Cited

U.S. PATENT DOCUMENTS

2018/0073121 A1  3/2018  Habu et al.

FOREIGN PATENT DOCUMENTS

| | | |
|---|---|---|
| EP | 3266607 A1 | 1/2018 |
| EP | 3401542 A1 | 11/2018 |
| JP | S60011353 A | 1/1985 |
| JP | H02270954 A | 11/1990 |
| JP | 2001270015 A | 10/2001 |
| JP | 2006137143 A | 6/2006 |
| JP | 2009511751 A | 3/2009 |
| JP | 4436954 B2 | 3/2010 |
| JP | 4436957 B2 | 3/2010 |
| WO | 2014115251 A1 | 7/2014 |
| WO | 20141152151 A1 | 7/2014 |
| WO | 2016140241 A1 | 9/2016 |

OTHER PUBLICATIONS

Office Action for Japanese Application No. 2018-215617 dated Dec. 24, 2019; 6 pp.

Extended European Search Report for European Application No. 19208528.0 dated Feb. 17, 2020; 7pp.

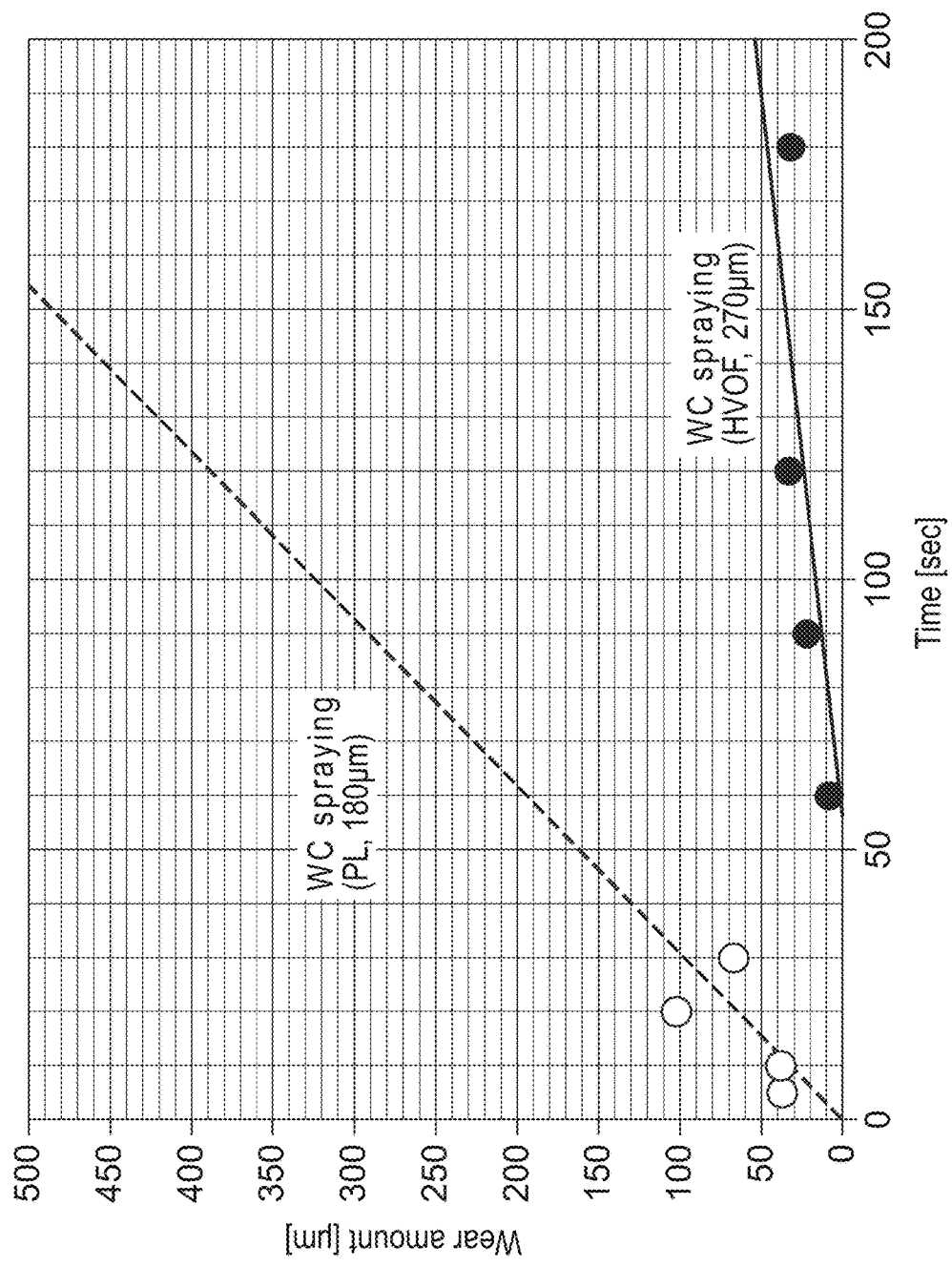

Blade longitudinal direction

WIND TURBINE BLADE AND METHOD FOR MANUFACTURING THE SAME

RELATED APPLICATIONS

The present application claims priority of Japanese Application Number 2018-215617 filed Nov. 16, 2018, the disclosure of which is hereby incorporated by reference herein in its entirety.

TECHNICAL FIELD

This disclosure relates to a wind turbine blade and a method for manufacturing the same.

BACKGROUND

Traditionally, it has been known that abrasion due to collision of foreign objects (e.g., rain drops, dust, and the like) in the air with a wind turbine blade in accordance with rotation of a wind turbine rotor causes so-called erosion to occur at the wind turbine blade on a leading edge side thereof. Countermeasures such that an erosion-resistant protection layer is stuck or coated onto the leading edge side of the wind turbine blade have been taken to prevent erosion at the wind turbine blade.

For example, Patent Document 1 discloses a technology to apply erosion-resistant coating on a surface of a blade using plasma spraying or high velocity flame (high velocity oxy-fuel: HVOF) spraying.

Further, not being specified for a wind turbine blade, Patent Documents 2 and 3 disclose forming a burnt intermediate layer, between a fiber-reinforced plastic base member and a spray overcoat layer (top coat), formed of a mixture of ceramic particles and resin being the same kind as constituent resin of the base member.

CITATION LIST

Patent Literature

Patent Document 1: US2016-0130705A
Patent Document 2: JP4436957B
Patent Document 3: JP4436954B

SUMMARY

Recently, for further improvement of erosion-resistant performance of a wind turbine blade, it has been desired to develop a technology for forming a precise spray film on a surface of a wind turbine blade.

To enhance preciseness of a spray film, it is required to have particles of a spraying material collide with a base material at high velocity, which may cause damage at the base material of a wind turbine blade.

Patent Document 1 discloses a technology in which a multilayer spray film includes a mixture of a material having a high hardness and a high elastic modulus and an added metal, the hardness and elastic modulus are increased by decreasing the added metal in weight % as being apart from the base material to prevent erosion and the like from the outside. However, no solution is disclosed for satisfying both of enhancing preciseness of erosion-resistant overcoat of a wind turbine blade and suppression of damage to be caused by collision of a spray material to a base material.

According to Patent Documents 2 and 3, not being specified as a technology for a wind turbine blade, surface characteristics such as wear-resistance are improved by forming a spray film on a fiber-reinforced plastic surface as a top coat. However, no countermeasure is disclosed as a technology to form a spray film precisely required for a top coat. Further, the intermediate layer is limited to be burnt by being formed in an electric furnace.

In this regard, it is an object of at least one embodiment of the present invention to improve erosion-resistant performance of a wind turbine blade without impairing functions of a base material.

(1) A wind turbine blade according to at least one embodiment of the present invention includes a base member formed of FRP and having a blade shape; an intermediate layer arranged on the base member and formed of metal, cermet, ceramic, or a mixture of at least one thereof and resin as a major constituent; and an erosion-resistant overcoat arranged on the intermediate layer and formed of a spray film having a porosity of 5% or lower.

Here, "porosity" is an index indicating a ratio of pore portions to an entire spray film including solid portions and the pore portions. The lower the porosity is, the higher the preciseness of the spray film is. "Porosity" may be obtained by analyzing an image taken by observing a section of a spray film, for example, with an optical microscope, SEM, or the like and calculating a value from an area ratio of pore portions with respect to the entire image.

Here, in the intermediate layer, the content rate of metal, cermet, ceramic, or the mixture is higher than that of the other constituents.

According to the configuration described above as (1), the erosion-resistant overcoat formed of a spray film having a porosity of 5% or lower is arranged on the base member of the wind turbine blade via the intermediate layer. Thus, since the precise spray film capable of exerting an excellent erosion-resistant performance is arranged on the surface of the FRP-made base member via the intermediate layer, erosion-resistant performance of the wind turbine blade can be extremely improved.

When a spray film is formed on the base member that is relatively large as for the wind turbine blade, the operation efficiency can be improved if the operation can be performed in the atmosphere. When forming of a spray film is performed in the air, a reaction time with oxygen is to be shortened to the extent possible, for example, by spraying particles of a spray material onto a base member at high velocity to suppress generation of an oxide film due to reaction between oxygen in the air and the spray material. According to the above, it is possible to form a precise spray film having a low porosity and high adhesion to the base member. However, if such a precise spray film is formed directly on the base member, the surface of the base member may be damaged. In this regard, with the method described above as (1), since the intermediate layer is interposed between the base member and the erosion-resistant overcoat, it is possible to suppress damage occurring on the surface of the base member by spraying for forming the erosion-resistant overcoat. Accordingly, erosion-resistant performance of the wind turbine blade can be extremely improved without deteriorating functions of the base member.

(2) In some embodiments, in the configuration described above as (1), the spray film forming the erosion-resistant overcoat is formed of cobalt alloy or cermet including at least one of alumina, tungsten carbide, silicon nitride, silicon carbide, zirconia, or chrome carbide.

According to the configuration described above as (2), the erosion-resistant overcoat can be formed of a material having high hardness and high abrasion resistance such as cobalt alloy or cermet including a ceramic material.

(3) In some embodiments, in the configuration described above as (1) or (2), the intermediate layer includes an intermediate spray film having a higher porosity than that of the spray film forming the erosion-resistant overcoat.

According to the configuration described above as (3), the intermediate layer that includes the intermediate spray film having a higher porosity than that of the spray film forming the erosion-resistant overcoat is arranged between the base member and the erosion-resistant overcoat. That is, the precise erosion-resistant overcoat having a low porosity is arranged at the outermost circumference and the intermediate spray film having a relatively high porosity is arranged between the erosion-resistant overcoat and the base member. Accordingly, since the intermediate spray film can be formed at spray velocity lower than spray velocity at which the erosion-resistant overcoat, for example, having a porosity of 5% or lower is formed, it is possible to efficiently suppress occurrence of damage on the surface of the base member by spraying for forming the intermediate layer (intermediate spray film).

(4) In some embodiments, in the configuration described above as (3), a ratio of the porosity of the intermediate spray film to the porosity of the spray film forming the erosion-resistant overcoat is 3 or higher.

According to the configuration described above as (4), the intermediate layer is formed of the intermediate spray film having a porosity more than three times higher than a porosity of the spray film forming the erosion-resistant overcoat. That is, since the erosion-resistant overcoat is formed to have a porosity being one third or lower than that of the intermediate layer, the precise erosion-resistant overcoat can be formed at the outermost circumference in arrangement that porosities are lowered in stages from the surface of the base member, as described above as (3).

(5) In some embodiments, in the configuration described above as (3) or (4), the porosity of the spray film forming the erosion-resistant overcoat is 3% or lower, and the porosity of the intermediate spray film is 6% or higher.

According to the configuration described above as (5), the intermediate layer is formed of the intermediate spray film having a porosity of 6% or higher, and the erosion-resistant overcoat is formed of the spray film having a porosity of 3% or lower. Thus, as described as (3) or (4), according to the configuration described above as (5) as well, the precise erosion-resistant overcoat can be formed at the outermost circumference in arrangement that porosities are lowered in stages from the surface of the base member.

(6) In some embodiments, in the configuration described above as any one of (3) to (5), the intermediate spray film is formed of cermet including at least one of alumina, tungsten carbide, silicon nitride, silicon carbide, zirconia, or chrome carbide or metal including at least one of cobalt alloy, stainless steel, steel, titanium, copper, or aluminum.

According to the configuration described above as (6), the intermediate layer can be formed of a material having high abrasion resistance such as cermet including a ceramic material and metal including cobalt alloy and the like.

(7) In some embodiments, in the configuration described above as (1) or (2), the intermediate layer includes a metal tape.

According to the configuration described above as (7), the metal tape can be adopted as the intermediate layer arranged between the base member and the erosion-resistant overcoat. That is, the intermediate layer can be easily formed with a simple method to fix the metal tape onto the base member.

Here, the metal tape may be fixed to the base member using an adhesive layer previously formed at the metal tape or using separately prepared adhesive.

(8) In some embodiments, in the configuration described above as any one of (1) to (7), the base member has a larger surface roughness Ra at a region which is covered with the intermediate layer and the erosion-resistant overcoat than that at a region which is not covered with the intermediate layer and the erosion-resistant overcoat.

According to the configuration described above as (8), owing to that the surface roughness Ra of the base member at the region covered with the intermediate layer and the erosion-resistant overcoat is set relatively large, adhesion of the intermediate layer onto the surface of the base member can be improved.

Here, as a method to set the surface roughness Ra of the base member at the region to be covered with the intermediate layer and the erosion-resistant overcoat at an appropriate value, a blast finishing may be performed on the surface of the base member at the region.

Here, specific numerical range of the surface roughness Ra of the base member at the region covered with the intermediate layer and the erosion-resistant overcoat is not specifically limited and, for example, a relation of "0.2 µm≤Ra≤20 µm" may be satisfied.

(9) In some embodiments, in the configuration described above as any one of (1) to (8), a level difference between a surface of a forming region of the erosion-resistant overcoat of the wind turbine blade and a surface of the wind turbine blade adjacent to the erosion-resistant overcoat outside the forming region is smaller than a total thickness of the erosion-resistant overcoat and the intermediate layer.

According to the configuration described above as (9), the level difference between the surface of the forming region of the erosion-resistant overcoat and the surface of the wind turbine blade adjacent to the erosion-resistant overcoat outside the forming region is lessened, so that aerodynamic characteristic deterioration of the wind turbine blade caused by arranging the erosion-resistant overcoat can be suppressed.

Here, the total thickness of the erosion-resistant overcoat and the intermediate layer may be 0.4 mm or smaller, and may be, for example, between 0.2 mm and 0.3 mm inclusive. When the total thickness of the erosion-resistant overcoat and the intermediate layer is 0.4 mm or smaller, aerodynamic characteristic deterioration can be suppressed by setting the level difference to 0.3 mm or smaller.

(10) In some embodiments, in the configuration described above as any one of (1) to (9), a surface of the base member in a forming region of the erosion-resistant overcoat of the wind turbine blade is lowered with respect to a surface of the base member outside the forming region.

According to the configuration described above as (10), owing to that the surface of the base member in the forming region of the erosion-resistant overcoat is lowered, the level difference at the boundary of the forming region of the erosion-resistant overcoat is lessened, so that aerodynamic characteristic deterioration of the wind turbine blade caused by arranging the erosion-resistant overcoat can be suppressed.

(11) In some embodiments, in the configuration described above as any one of (1) to (10), the wind turbine blade further includes a slope member arranged on the base member as being adjacent to the erosion-resistant overcoat, the slope member having thickness decreasing as being apart from a boundary with a forming region of the erosion-resistant overcoat, and the level difference is lessened by the slope member.

According to the configuration described above as (11), owing to that the slope member is arranged adjacent to the erosion-resistant overcoat, the level difference at the boundary of the forming region of the erosion-resistant overcoat is lessened, so that aerodynamic characteristic deterioration of the wind turbine blade caused by arranging the erosion-resistant overcoat can be suppressed.

Here, it is also possible to lessen the level difference at the boundary of the forming region of the erosion-resistant overcoat by combining the configuration described above as (10) and the configuration described above as (11).

(12) In some embodiments, in the configuration described above as any one of (1) to (11), the intermediate layer and the erosion-resistant overcoat are formed on a surface of the base member having the blade shape at least at a region on a blade distal end side and/or a region on a leading edge side of the wind turbine blade.

According to the configuration described above as (12), it is possible to arrange the intermediate layer including metal, cermet, ceramic, or a mixture of at least one thereof and resin as a major constituent and the erosion-resistant overcoat formed of a spray film at a region of the wind turbine blade on the blade distal end side and/or the leading edge side being most easily influenced by deterioration or damage due to erosion. Accordingly, the wind turbine blade can be appropriately protected from erosion.

A wind turbine according to at least one embodiment of the present invention includes a wind turbine rotor including the wind turbine blade described above as any one of (1) to (12).

According to the configuration, it is possible to provide the wind turbine including the wind turbine blade having functions and effects described above in any one of (1) to (12).

(13) A method for manufacturing a wind turbine blade according to at least one embodiment of the present invention includes a step of forming an intermediate layer formed of metal, cermet, ceramic, or a mixture of at least one thereof and resin as a major constituent on a base member formed of FRP and having a blade shape; and a step of forming an erosion-resistant overcoat having a porosity of 5% or less on the intermediate layer with HVOF spraying.

According to the method described above as (13), as described above in (1), owing to that the intermediate layer is interposed between the base member and the erosion-resistant overcoat, a spray material having excellent erosion-resistant performance can be appropriately selected and adopted while suppressing damage on the surface of the base member caused by spraying for forming the erosion-resistant overcoat. Accordingly, erosion-resistant performance of the wind turbine blade can be extremely improved.

(14) In some embodiments, in the method described above as (13), the intermediate layer is formed with atmospheric plasma spraying.

According to the method described above as (14), the intermediate layer to be formed on the FRP-made base member can be formed with atmospheric plasma spraying suitable for spraying onto FRP. Accordingly, the intermediate layer can be formed without causing damage on the surface of the base member.

(15) In some embodiments, in the method described above as (13) or (14), the erosion-resistant overcoat is formed at an area larger than an operational area of a spraying device by moving the spraying device relatively to the base member along a blade distal end for a region of the blade distal end of the wind turbine blade and along a blade longitudinal direction of the wind turbine blade for a region of a leading edge of the wind turbine blade.

In general, the operational area is limited when the spraying device is used as being placed at a fixed position. Accordingly, when spraying is performed on a spray target being relatively large such as the wind turbine blade, it is difficult to form a spray film over the entire spray target. In this regard, according to the method described above as (15) to move the spraying device relatively to the base member of the wind turbine blade, an atmospheric plasma spray film or an HVOF spray film can be formed at a larger area than the operational area in the case that the spraying device is placed at a certain position in accordance with manufacturing circumstances of the wind turbine blade.

According to at least one embodiment of the present invention, it is possible to improve erosion-resistant performance of a wind turbine blade without impairing functions of a base material.

BRIEF DESCRIPTION OF DRAWINGS

FIG. 8 is a graph illustrating erosion-resistant characteristics of spray films with HVOF spraying and atmospheric plasma spraying.

FIGS. 9A and 9B illustrate wind turbine blades according to other embodiments, while FIG. 9A is a sectional view illustrating a configuration that a surface of the base member in the forming region of the erosion-resistant overcoat of the wind turbine blade is lowered with respect to a surface of the base member outside the forming region and FIG. 9B is a sectional view illustrating a slope member according to another embodiment.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For example, an expression of an equal state such as "same", "equal" and "uniform" shall not be construed as indicating only the state in which the feature is strictly equal, but also includes a state in which there is a tolerance or a difference that can still achieve the same function.

Further, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
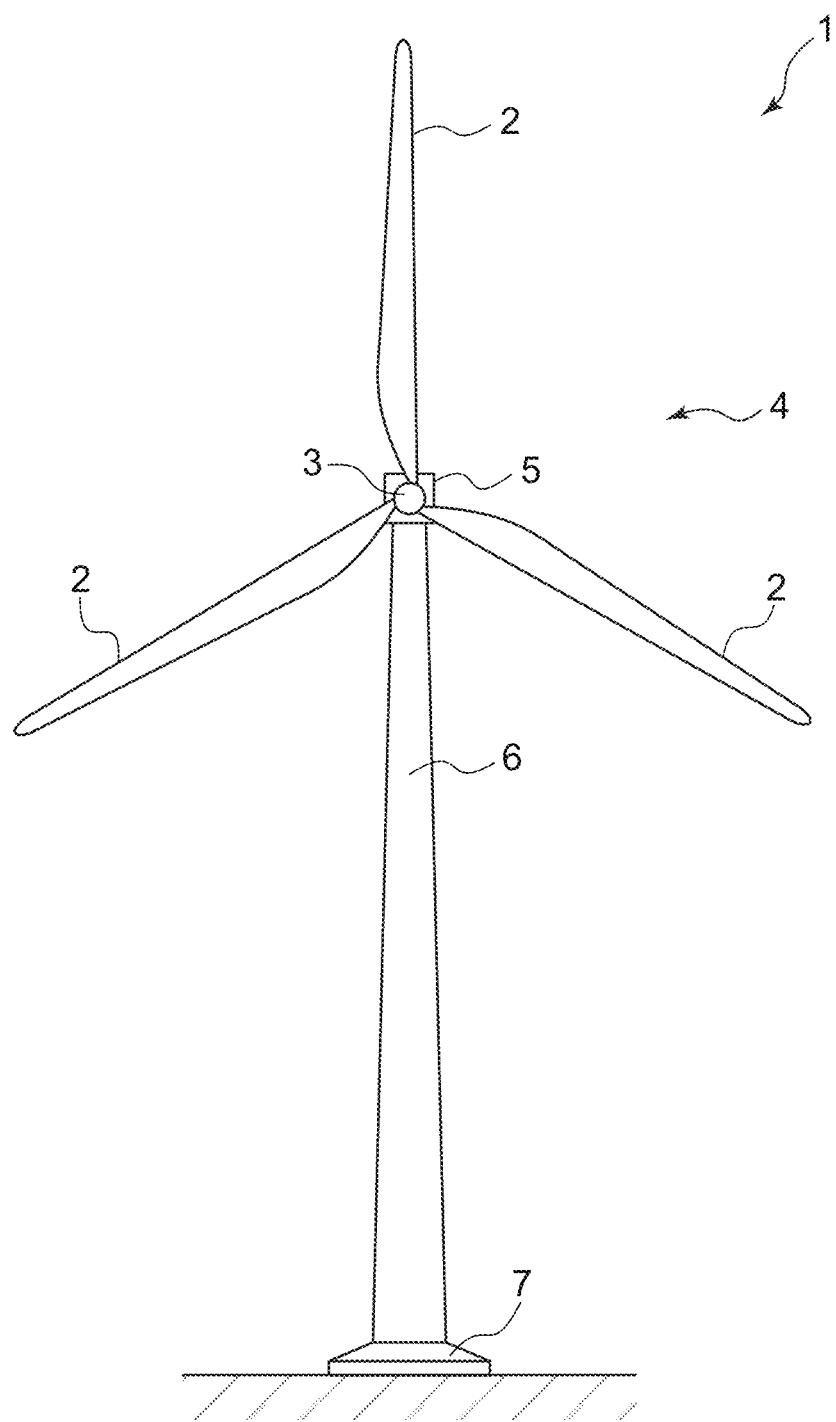
FIG. 1 is a schematic view illustrating a structural example of a wind power generator apparatus to which wind turbine blades according to an embodiment is applied.

FIG. 1 is a schematic view illustrating a structural example of a wind power generator apparatus (hereinafter, called wind turbine) to which wind turbine blades according to an embodiment is applied.

As illustrated in FIG. 1, a wind turbine 1 includes a rotor 4 including a plurality (in the example illustrated in FIG. 1, three) of wind turbine blades 2 and a hub 3 to which the wind turbine blade 2 is attached, a nacelle 5 rotatably supporting the rotor 4 through an main shaft (not illustrated) and a main bearing (not illustrated), a generator (not illustrated) driven by receiving rotational force of the main shaft, a tower 6 supporting the nacelle 5 in a horizontally swingable manner, and a base 7 on which the tower 6 is installed. In the wind turbine 1, rotor 4 is rotated when the wind turbine blades 2 receives wind, so that electric power is generated by the generator (not illustrated) connected to the rotor 4.

Figure 2:
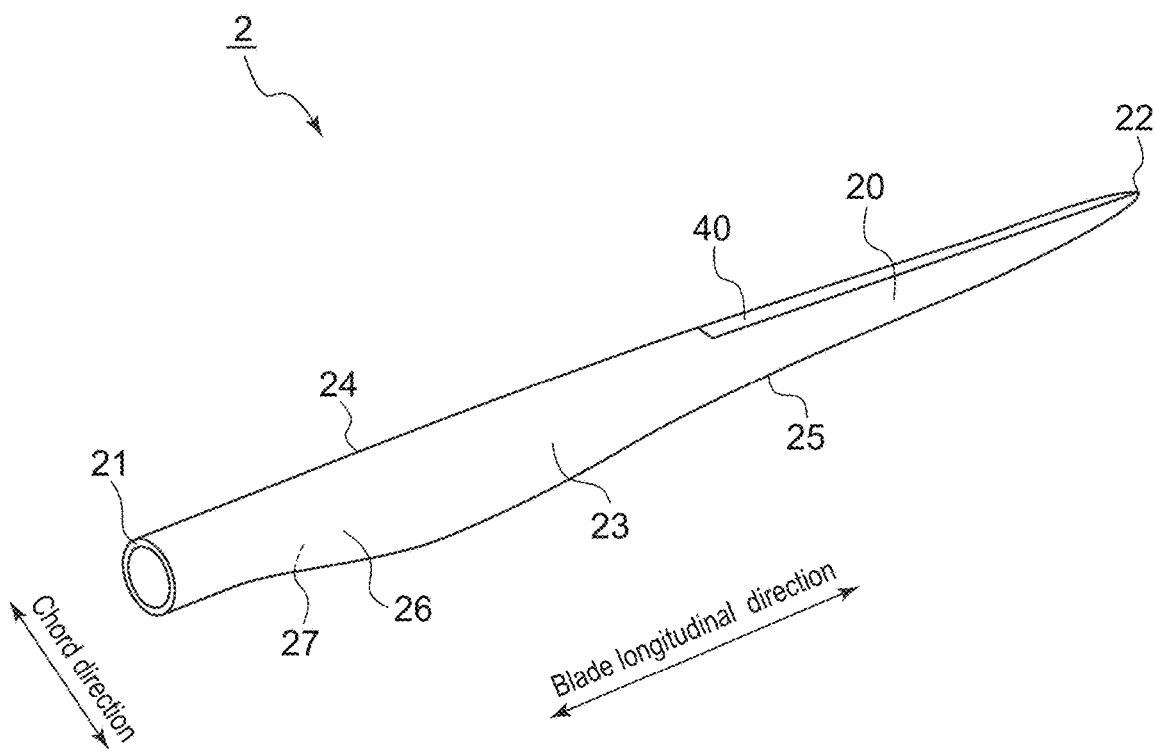
FIG. 2 is a perspective view illustrating a wind turbine blade according to an embodiment.
Figure 3:
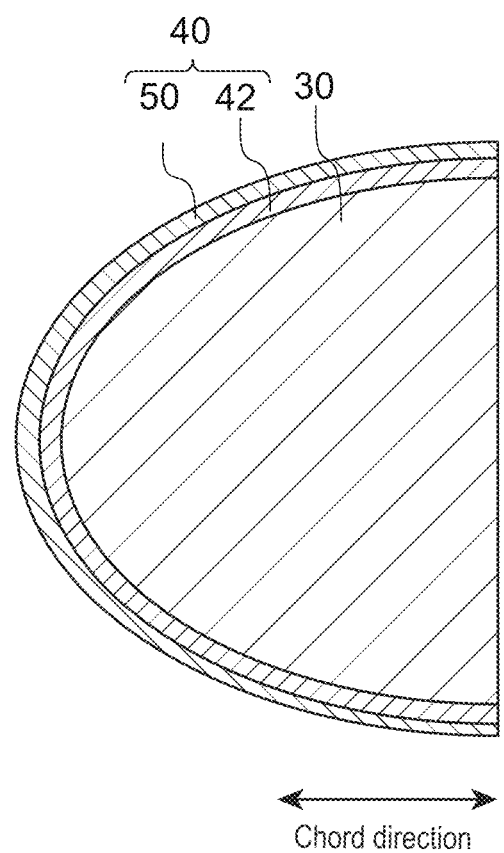
FIG. 3 is a sectioned partial view of a wind turbine blade according to an embodiment.

Next, the wind turbine blade 2 according to at least one embodiment of the present invention will be described in detail. FIG. 2 is a perspective view illustrating a wind turbine blade according to an embodiment. FIG. 3 is a sectioned partial view of a wind turbine blade according to an embodiment.

As illustrated in FIG. 2, the wind turbine blade 2 includes a blade base portion 21 attached to the hub 3 of the wind turbine 1, a blade distal end portion 22 at a position farthest from the hub 3, and a blade shape portion 20 extending between the blade base portion 21 and the blade distal end portion 22. Further, the wind turbine blade 2 includes a leading edge 24 and a tailing edge 25 at a region between the blade base portion 21 and the blade distal end portion 22. A profile of the wind turbine blade 2 is defined by a pressure surface 27 being a pressure surface (positive pressure face) and a suction surface 26 being a negative pressure face facing the pressure surface 27.

As illustrated in FIGS. 2 and 3, the wind turbine blade 2 of at least one embodiment of the present invention includes a base member 30 formed of fiber-reinforced plastic (FRP) and having a blade shape, an intermediate layer 42 arranged on the base member 30, and an erosion-resistant overcoat 50 arranged on the intermediate layer 42 and formed of a spray film having a porosity of 5% or lower. Here, the intermediate layer 42 and the erosion-resistant overcoat 50 constitute a wind turbine blade protector 40 protecting the base member 30.

The base member (or base material) 30 may be formed of carbon fiber reinforced plastic (CFRP), glass fiber reinforced plastic (Gl-RP), or the like. Since well-known technologies can be applied as the method for forming the base member 30 using FRP and configuration of the base member 30, detailed description thereof is omitted.

The intermediate layer 42 is formed of metal, cermet, ceramic, or a mixture of at least one thereof and resin as a major constituent.

The intermediate layer 42 forms the first layer of the wind turbine blade protector 40 (see FIGS. 2 and 3) formed on a surface of the base member 30 and serves as a protecting layer (base layer) formed on the base member 30 before forming the erosion-resistant overcoat 50.

The intermediate layer 42 is excellent in hardness, abrasion resistance, heat resistance, and the like when ceramic is used as a major constituent, and in toughness when metal is used as a major constituent. When cermet in which metal binder is added to ceramic is used as a major constituent, it is possible to form the intermediate layer 42 having higher hardness than metal and higher toughness and chip-proof properties than ceramic.

The intermediate layer 42 may contain various additives other than the major constituent being one of metal, cermet, ceramic, and the mixture. Here, the content rate of the major constituent is higher than that of the other constituents.

The intermediate layer 42 having the abovementioned configuration may be formed with any of various methods. For example, when the intermediate layer 42 includes metal, cermet, or ceramic as a major constituent, the intermediate layer 42 is formed with electric spraying such as arc spraying and plasma spraying. When the intermediate layer 42 includes the abovementioned mixture as a major constituent, a resin sheet formed of resin composition with at least one of metal, cermet, and ceramic dispersed may be stuck on a surface of the base member 30.

The erosion-resistant overcoat 50 forms the second layer of the wind turbine blade protector 40 formed on the surface of the base member 30 and serves as an outermost layer for protecting the base member 30 from liquid drop erosion caused by rain drops, dust and the like. In a non-limiting example, a precise spray film having a porosity of 1.6% formed of cermet including tungsten carbide (WC) may be used as the erosion-resistant overcoat 50.

The erosion-resistant overcoat 50 may be formed with any of various methods, for example, with gas spraying such as high velocity flame spraying (HVOF spraying) described later (see FIG. 7).

According to the above configuration, the erosion-resistant overcoat 50 formed of a spray film having a porosity of 5% or lower can be arranged on the base member 30 of the wind turbine blade 2 via the intermediate layer 42. Thus, since the precise spray film capable of exerting an excellent erosion-resistant performance is arranged on the surface of the FRP-made base member 30 via the intermediate layer 42, erosion-resistant performance of the wind turbine blade 2 can be extremely improved.

When a spray film is formed on the base member 30 that is relatively large as for the wind turbine blade 2, the operation efficiency can be improved if the operation can be performed in the atmosphere. When forming of a spray film is performed in the air, a reaction time with oxygen is to be shortened to the extent possible, for example, by spraying particles of a spray material onto a base member at high velocity to suppress generation of an oxide film due to reaction between oxygen in the air and the spray material. According to the above, it is possible to form a precise spray film having a low porosity and high adhesion to the base member 30. However, if such a precise spray film is formed directly on the base member 30, the surface of the base member 30 may be damaged. In this regard, with the abovementioned method, since the intermediate layer 42 is interposed between the base member 30 and the erosion-resistant overcoat 50, it is possible to suppress damage occurring on the surface of the base member 30. Accordingly, erosion-resistant performance of the wind turbine blade 2 can be extremely improved without deteriorating functions of the base member 30.

In some embodiments, for example, as illustrated in FIG. 2, the intermediate layer 42 and the erosion-resistant overcoat 50 may be arranged at least at a region, being on the blade distal end portion 22 side and the leading edge 24 side of the wind turbine blade 2, of the surface of the blade-shaped base member 30. According to the above, it is possible to arrange the intermediate layer 42 including metal, cermet, ceramic, or a mixture of at least one thereof and resin as a major constituent and the precise erosion-resistant overcoat 50 having a porosity of 5% or lower formed of a spray film at a region of the wind turbine blade 2 on the blade distal end portion 22 side and the leading edge 24 side having high circumferential velocity and being most easily influenced by deterioration or damage due to erosion. Accordingly, the wind turbine blade 2 can be appropriately protected from erosion.

In some embodiments, the spray film forming the erosion-resistant overcoat 50 may be formed of cobalt alloy or cermet including at least one of alumina, tungsten carbide, silicon nitride, silicon carbide, zirconia, and chrome carbide. That is, the erosion-resistant overcoat 50 can be formed of a material having high hardness and high abrasion resistance such as cobalt alloy or cermet including a ceramic material (alumina, tungsten carbide, silicon nitride, silicon carbide, zirconia, chrome carbide, or the like).

Figure 4:
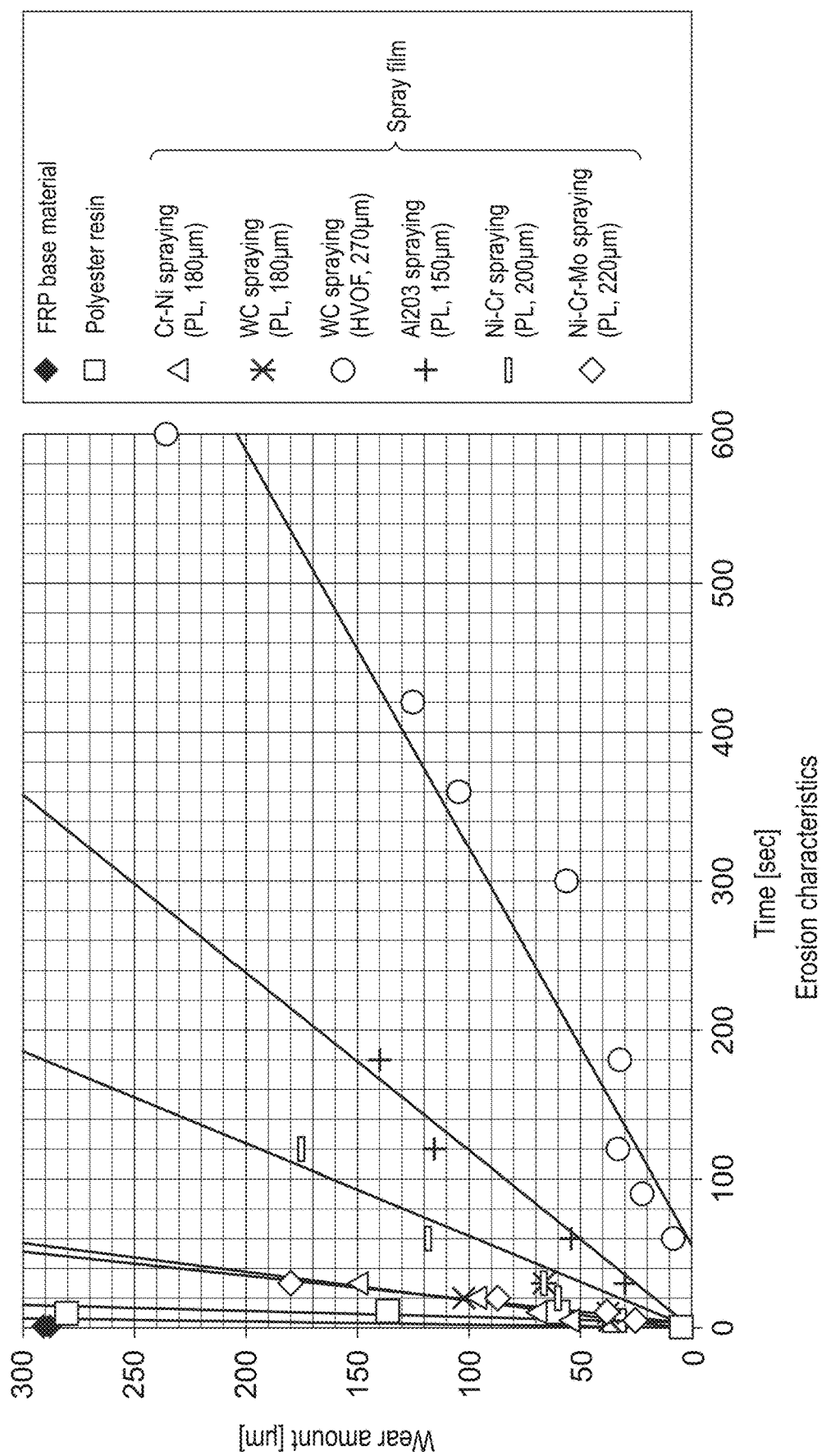
FIG. 4 is a graph illustrating erosion characteristics of various materials including a spray film in an embodiment.

FIG. 4 is a graph illustrating erosion characteristics of various materials including the spray film according to an embodiment. FIG. 4 shows relations between a time (sec) and a wear amount (μm) while injecting water jet onto a test piece, for example, using waterjet method test equipment. FIG. 4 shows results of tests performed on sprayed overcoats for materials shown as spray films. Here, PL represents atmospheric plasma spraying and HVOF represents high velocity flame spraying.

FIG. 4 shows that erosion-resistant characteristics with the WC spraying HVOF having a porosity of 5% or lower formed by spraying are superior to those of FRP forming the base member 30 and other spray films.

In some embodiments, the intermediate layer 42 may include an intermediate splay film having a higher porosity than that of the spray film forming the erosion-resistant overcoat 50.

In a non-limiting example, a spray film that includes cermet including tungsten carbide (WC) and has a porosity of 7.3% being higher than a porosity (5% or lower) of the erosion-resistant overcoat 50 may be used as the intermediate layer 42.

According to the above, the intermediate layer 42 that includes the intermediate spray film having a higher porosity than that of the spray film forming the erosion-resistant overcoat 50 is arranged between the base member 30 and the erosion-resistant overcoat 50. Here, for forming the intermediate layer 42, without adhering to porosity lowness thereof, the intermediate spray film can be formed at spray velocity in degree not to cause damage on a surface of FRP forming the base member 30. That is, since the intermediate spray film can be formed at spray velocity lower than spray velocity at which the erosion-resistant overcoat 50, for example, having a porosity of 5% or lower is formed, it is possible to efficiently suppress occurrence of damage on the surface of the base member 30 by spraying for forming the intermediate layer 42 (intermediate spray film). Then, the precise erosion-resistant overcoat 50 can be formed at the outermost circumference in arrangement that porosities are lowered in stages from the surface of the base member 30.

In the case that the intermediate layer 42 includes the intermediate spray film, a ratio of the porosity of the intermediate spray film to the porosity of the spray film forming the erosion-resistant overcoat 50 may be 3 or higher.

For example, in the case that a spray film having a porosity of 1.6% and formed of cermet including tungsten carbide (WC) is used for the erosion-resistant overcoat 50, a spray film having a porosity of 7.3% and formed of cermet including tungsten carbide (WC) may be used for the intermediate spray film.

According to the above, the intermediate layer 42 can be formed of the intermediate spray film having a porosity more than three times higher than a porosity of the spray film forming the erosion-resistant overcoat 50. Accordingly, since spray velocity for forming a spray film of the intermediate layer 42 on the surface of the base member 30 can be lowered by adopting the intermediate spray film having a relatively large porosity as the intermediate layer 42, the surface of the base member 30 can be protected more effectively. Further, since the erosion-resistant overcoat 50 can be formed to have a porosity being one third or lower than that of the intermediate layer 42, the precise erosion-resistant overcoat 50 can be formed at the outermost circumference in arrangement that porosities are lowered in stages from the surface of the base member 30, as described above.

In some embodiments, the porosity of the spray film forming the erosion-resistant overcoat 50 may be 3% or lower, and the porosity of the intermediate spray film may be 6% or higher. For example, as described above, it is possible to adopt a combination of the spray film (having a porosity of 1.6%) for the erosion-resistant overcoat 50 and the intermediate spray film (having a porosity of 7.3%) for the intermediate layer 42.

According to the above, the intermediate layer 42 is formed of the intermediate spray film having a porosity of 6% or higher, and the erosion-resistant overcoat 50 is formed of the spray film having a porosity of 3% or lower. Thus, the precise erosion-resistant overcoat 50 can be formed at the outermost circumference in arrangement that porosities are lowered in stages from the surface of the base member 30.

In some embodiments, the intermediate spray film may be formed of cermet including at least one of alumina, tungsten carbide, silicon nitride, silicon carbide, zirconia, and chrome carbide or metal including at least one of cobalt alloy, stainless steel, steel, titanium, copper, and aluminum.

That is, a metal spray layer such as SUS, steel, titanium, copper, and aluminum other than constituents of the erosion-resistant overcoat 50 being the second layer of the wind turbine blade protector 40 may be adopted as a constituent of the intermediate layer 42 (intermediate spray film) being the first layer.

According to the above, the intermediate layer 42 can be formed of a material having high abrasion resistance such as cermet including a ceramic material and metal including cobalt alloy and the like. In addition, since metal more preferable than a ceramic material in a viewpoint of an adhesion property to FRP can be used as a binder, adhesion property of the intermediate layer 42 to the base member 30 can be improved.

Figure 5:
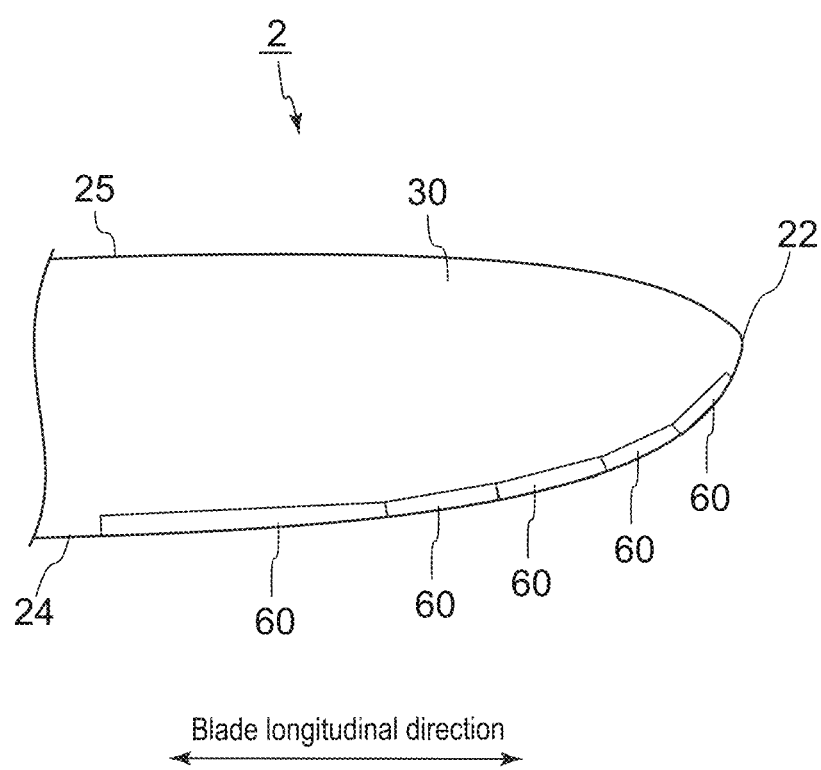
FIG. 5 is a schematic view illustrating a method for manufacturing a wind turbine blade according to an embodiment.

In some embodiments, for example, as illustrated in FIG. 5, the intermediate layer 42 may include a metal tape 60. That is, the intermediate layer 42 may be formed of, for example, a stainless tape (SUS tape).

According to the above, since the intermediate layer 42 can be easily formed with a simple method to attach a metal tape 60 as the intermediate layer 42 to be arranged between the base member 30 and the erosion-resistant overcoat 50, work time can be shortened.

Here, the metal tape 60 may be attached to the base member 30 using an adhesive layer previously formed at the metal tape 60 or using separately prepared adhesive.

In some embodiments, the intermediate layer 42 may be formed with atmospheric plasma spraying (APS). That is, the intermediate spray film may be formed with atmospheric plasma spraying.

Figure 6:
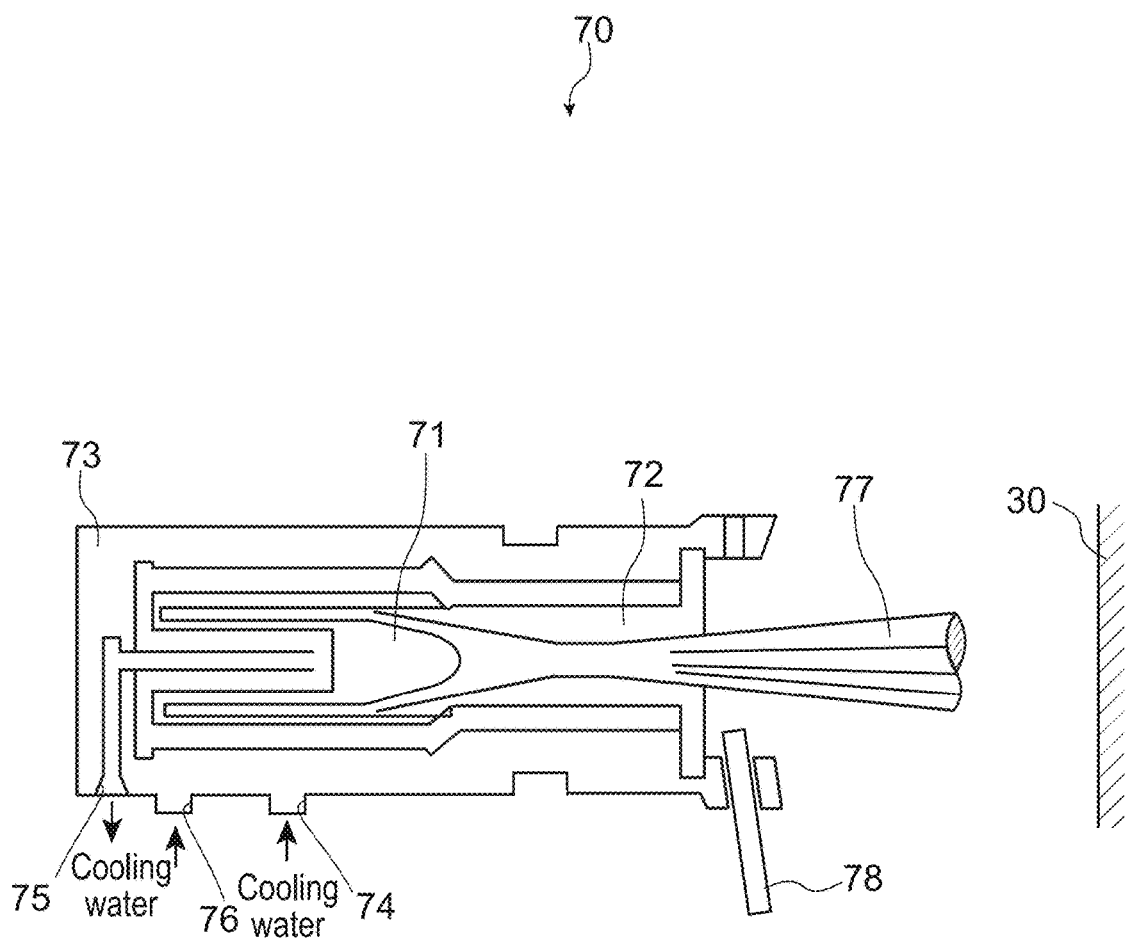
FIG. 6 is a schematic view illustrating a plasma spraying device according to an embodiment.

In the following, description will be provided on plasma splaying and HVOF spraying. FIG. 6 is a schematic view illustrating a plasma spraying device according to an embodiment. FIG. 7 is a schematic view illustrating an HVOF spraying device according to an embodiment.

Plasma spraying is a kind of electric spraying and can be performed, for example, using a plasma spraying device 70 illustrated in FIG. 6.

The plasma spraying device 70 includes a torch 73 in which an electrode (negative electrode) 71 and a nozzle (positive electrode) 72 are arranged. The torch 73 includes a cooling water inlet port 74 for introducing cooling water and a cooling water outlet port 75 for ejecting the cooling water after passing through a cooling water passage in the torch 73. Further, the torch 73 includes a gas supply port 76 to which operational gas such as argon, helium, and nitrogen is supplied. The operational gas introduced through the gas supply port 76 is made into plasma with arc generated between the electrode 71 and the nozzle 72, and then, injected through the nozzle 72 as plasma jet 77. A powder material is supplied from a powder supply pipe 78 toward the plasma jet 77. The powder material injected toward the plasma jet 77 flies toward the base material (base member 30) as being melted in the plasma jet 77 and collides with a surface of the base material and layered thereon to form a spraying film.

In the present disclosure, since the wind turbine blade 2 being large compared to, for example, a mechanical component or the like is a target to be processed, description is provided on an example of applying atmospheric plasma spraying from a viewpoint of operability. However, it is not intended to exclude low-pressure plasma spraying (or vacuum plasma spraying) to be performed under a low-pressure circumstance. According to such plasma spraying, a selection freedom degree is increased and an adhesion property between the base member 30 and the spray film can be enhanced.

Figure 7:
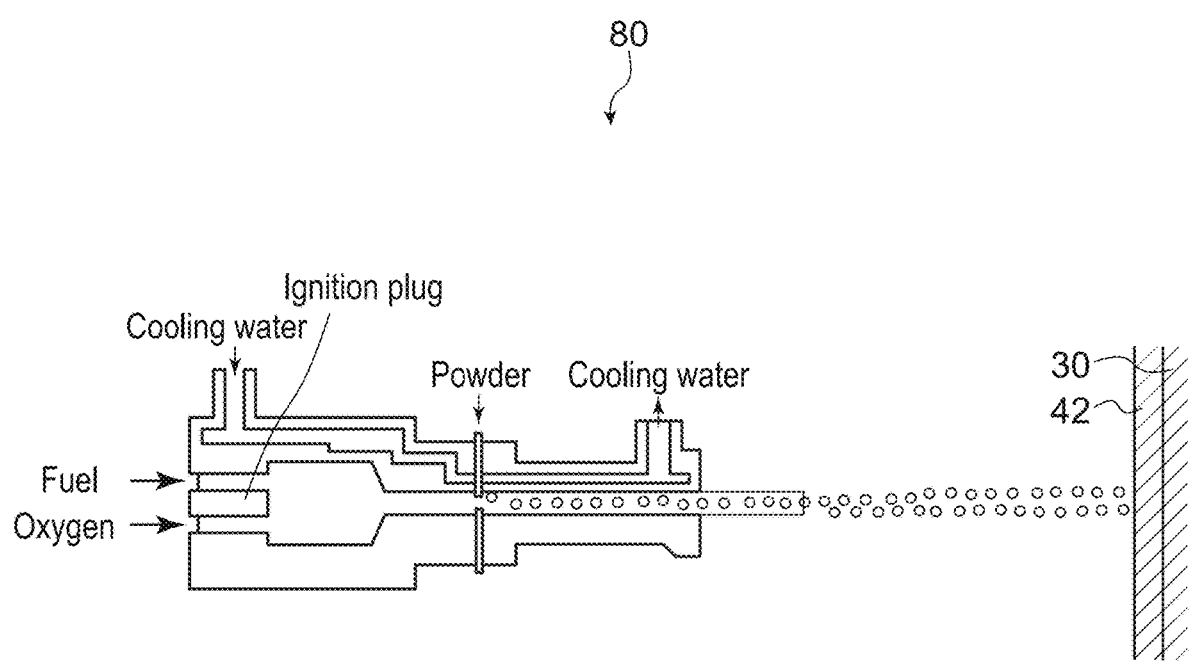
FIG. 7 is a schematic view illustrating an HVOF spraying device according to an embodiment.

Next, in HVOF spraying (high velocity flame spraying), for example, as illustrated in FIG. 7, high velocity flame (combustion flame jet flow) 87 comparable to burst combustion flame is generated by increasing pressure in a combustion chamber in a spraying device 80 (spray gun), and a powder spray material is supplied to the center of the high velocity flame 87 to be in a state of melting or half-melting and is continuously injected at high velocity. Since the powder spraying material collides with the base member 30 at supersonic velocity, it is possible to form an overcoat that is extremely precise and has high adhesion. Since it is particularly advantageous for forming an abrasion-resistant overcoat of a carbide cermet material and an overcoat is continuously formed, a more homogenous overcoat can be obtained compared to the burst spraying method. Such HVOF spraying may be performed in the atmosphere for example, in a state that the base member 30 is kept at 100° C. or lower (e.g., 80° C. or lower).

As described above, when the intermediate layer 42 is formed with atmospheric plasma spraying, since the intermediate layer 42 to be formed on the FRP-made base member 30 can be formed by spraying particles at low velocity compared to high velocity spraying such as HVOF, the intermediate layer 42 can be formed without causing damage on the surface of the base member 30. Then, since high velocity flame spraying (HVOF) can be performed, without causing damage on FRP of the base material, on the intermediate layer 42 formed as described above and having a higher hardness than the base member 30 (FRP), the precise erosion-resistant overcoat 50 having a high hardness can be preferably formed at the outermost layer of the wind turbine blade protector 40.

FIG. 8 is a graph illustrating erosion-resistant characteristics of spray films by WC spraying with HVOF spraying and atmospheric plasma spraying. As clearly seen from FIG. 8, a spray film formed with HVOF spraying has superior erosion-resistant characteristics to a spray film formed with atmospheric plasma spraying.

In some embodiments, the base member 30 may have a larger surface roughness Ra at a region (forming region 100) which is covered with the intermediate layer 42 and the erosion-resistant overcoat 50 than that at a region which is not covered with the intermediate layer 42 and the erosion-resistant overcoat 50.

According to the above configuration, owing to that the surface roughness Ra of the base member 30 at the forming region 100 covered with the intermediate layer 42 and the erosion-resistant overcoat 50 is set relatively large, adhesion of the intermediate layer 42 onto the surface of the base member 30 can be improved.

Here, as a method to set the surface roughness Ra of the base member 30 at the forming region 100 to be covered with the intermediate layer 42 and the erosion-resistant overcoat 50 at an appropriate value, a blast finishing may be performed on the surface of the base member 30 at the forming region 100.

Here, specific numerical range of the surface roughness Ra of the base member 30 at the forming region 100 covered with the intermediate layer 42 and the erosion-resistant overcoat 50 is not specifically limited and, for example, a relation of "0.2 µm≤Ra≤20 µm" may be satisfied.

In some embodiments, at a boundary of the forming region 100 of the erosion-resistant overcoat 50 of the wind turbine blade 2, a level difference ΔX between a surface of the erosion-resistant overcoat 50 and a surface 30B of the wind turbine blade 2 adjacent to the erosion-resistant overcoat 50 outside the forming region 100 may be smaller than a total thickness of the erosion-resistant overcoat 50 and the intermediate layer 42.

According to the above, the level difference ΔX at the boundary of the forming region 100 of the erosion-resistant overcoat 50 is lessened, so that aerodynamic characteristic deterioration of the wind turbine blade 2 caused by arranging the erosion-resistant overcoat 50 can be suppressed.

Here, the total thickness of the erosion-resistant overcoat 50 and the intermediate layer 42 may be 0.4 mm or smaller, and may be, for example, between 0.2 mm and 0.3 mm inclusive. When the total thickness of the erosion-resistant overcoat 50 and the intermediate layer 42 is 0.4 mm or smaller, aerodynamic characteristic deterioration can be suppressed by setting the level difference ΔX to 0.3 mm or smaller.

Figure 9A:
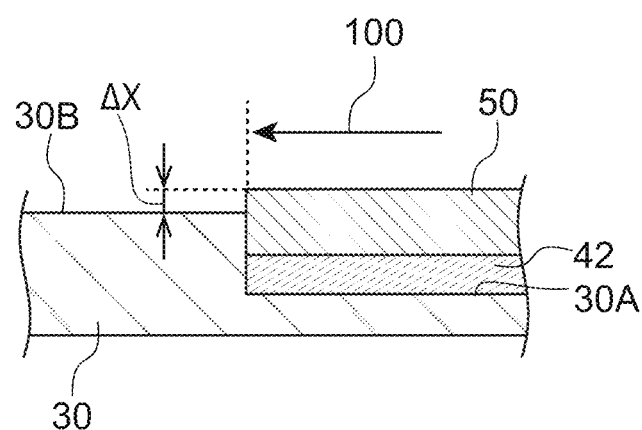
Figure 9B:
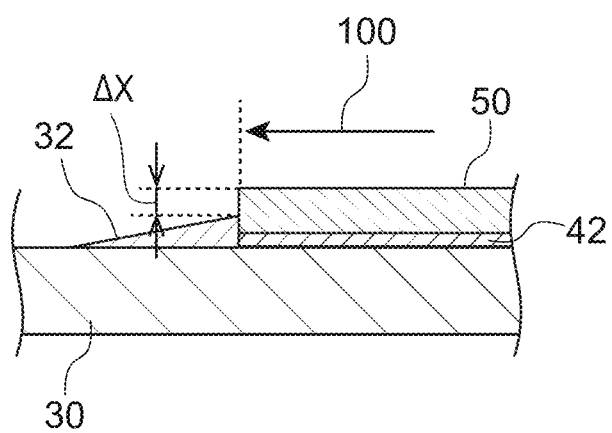

FIGS. 9A and 9B illustrate wind turbine blades according to other embodiments, while FIG. 9A is a sectional view illustrating a configuration that a surface of the base member in the forming region of the erosion-resistant overcoat of the wind turbine blade is lowered with respect to a surface of the base member outside the forming region and FIG. 9B is a sectional view illustrating a slope member according to another embodiment.

As illustrated in FIGS. 9A and 9B as a non-limiting example, in the base member 30 in some embodiments, the surface 30A of the base member 30 in the forming region of the erosion-resistant overcoat 50 of the wind turbine blade 2 may be lowered with respect to the surface 30B outside the forming region 100.

According to the above configuration, owing to that the surface 30A of the base member 30 in the forming region 100 of the erosion-resistant overcoat 50 is lowered, the level difference ΔX at the boundary of the forming region 100 of the erosion-resistant overcoat 50 is lessened, so that aerodynamic characteristic deterioration of the wind turbine blade 2 caused by arranging the erosion-resistant overcoat 50 can be suppressed.

In some embodiments, the wind turbine blade 2 may include a slope member 32 arranged on the base member 30 as being adjacent to the erosion-resistant overcoat 50, the slope member 32 having thickness decreasing as being apart from the boundary with the forming region 100 of the erosion-resistant overcoat 50.

Owing to that the slope member 32 is arranged adjacent to the erosion-resistant overcoat 50 as described above, the level difference ΔX at the boundary of the forming region 100 of the erosion-resistant overcoat 50 is lessened, so that aerodynamic characteristic deterioration of the wind turbine blade 2 caused by arranging the erosion-resistant overcoat 50 can be suppressed.

Here, it is also possible to lessen the level difference ΔX at the boundary of the forming region 100 of the erosion-resistant overcoat 50 by combining the abovementioned configuration to lower the surface 30A and the abovementioned slope member 32.

Figure 10:
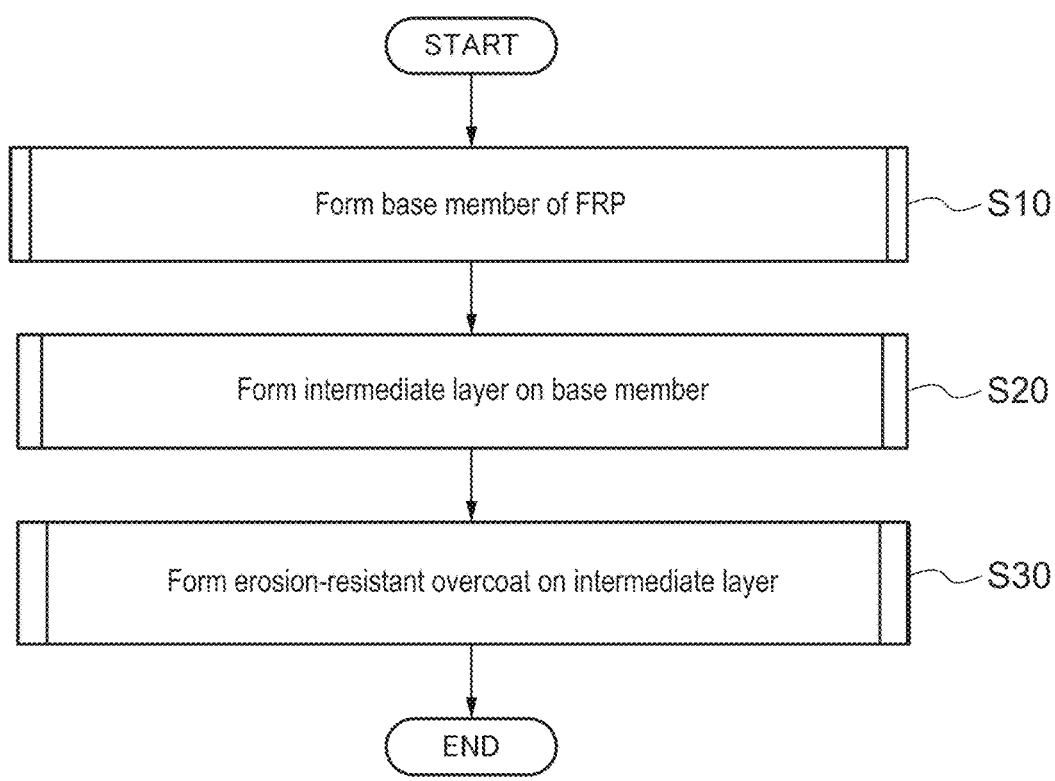
FIG. 10 is a flowchart illustrating a method for manufacturing a wind turbine blade according to an embodiment.

FIG. 10 is a flowchart illustrating a method for manufacturing a wind turbine blade according to an embodiment.

As illustrated in FIG. 10, a method for manufacturing the wind turbine blade 2 according to at least one embodiment of the present invention may include a step (step S10) of forming the base member 30 having blade shape using FEP, a step (step S20) of forming the intermediate layer 42 formed of metal, cermet, ceramic, or a mixture of at least one thereof and resin as a major constituent on the base member 30, and a step (step S30) of forming the erosion-resistant overcoat 50 having a porosity of 5% or less on the intermediate layer 42 with HVOF (high velocity oxy-fuel) spraying (high velocity flame spraying).

As described above, in HVOF spraying, an overcoat is formed on a surface of a target to be processed (in the example of the present disclosure, the base member 30 of the wind turbine blade 2) by generating jet flow with combustion gas at supersonic velocity and causing the spray material to be melted and accelerated.

With the above method, as described above, owing to that the intermediate layer 42 is interposed between the base member 30 and the erosion-resistant overcoat 50, a spray material having excellent erosion resistant-performance can be appropriately selected and adopted without causing damage on the surface of the base member 30 by high velocity spraying for forming the erosion-resistant overcoat 50 with HVOF spraying. Accordingly, erosion-resistant performance of the wind turbine blade 2 can be extremely improved.

Figure 11:
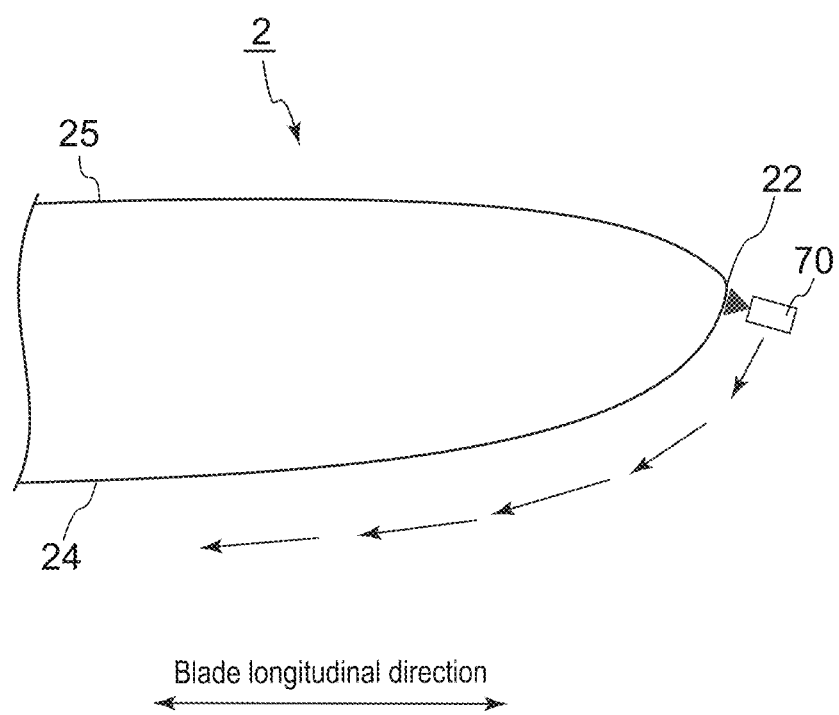
FIG. 11 is a schematic view illustrating a method for manufacturing a wind turbine blade according to an embodiment.

FIG. 11 is a schematic view illustrating a method for manufacturing a wind turbine blade according to another embodiment.

As illustrated in FIG. 11, in some embodiments, an atmospheric plasma spray film or an HVOF spray film may be formed at an area larger than an operational area of the spraying device 70 or the spraying device 80 by moving the spraying device 70 (or the spraying device 80) relatively to the base member 30 along a blade longitudinal direction of the wind turbine blade 2.

In general, the operational area is limited when the spraying device 70 or 80 is used as being placed at a fixed position. Accordingly, when spraying is performed on a spray target being relatively large such as the wind turbine blade 2, it is difficult to form a spray film over the entire spray target. In this regard, with the method to move the spraying device 70 or 80 in the blade longitudinal direction as described above, since the spraying device 70 or 80 is moved along the longitudinal direction of the wind turbine blade 2, an atmospheric plasma spray film or an HVOF spray film can be formed at a larger area than the operational area in the case that the spraying device 70 or 80 is placed at a certain position.

Here, for moving the spraying device 70 or 80, the spraying device 70 or 80 may be manually moved by an operator after being placed on an unillustrated dolly or the like, or dedicated moving equipment such as rails and a lifting apparatus may be arranged to be capable of moving at least in the blade longitudinal direction.

According to the above, the operation can be easily performed even under manufacturing circumstances of the wind turbine blade 2.

Thus, according to at least one embodiment of the present invention, erosion-resistant performance of the wind turbine blade 2 can be improved without deteriorating functions of the base member 30 being the base material.

In the above, description has been provided on the embodiments of the present invention. However, not limited to the embodiments described above, the present invention includes modifications of the embodiments and appropriate combinations thereof.

The invention claimed is:

1. A wind turbine blade comprising:
a base member formed of FRP and having a blade shape;
an intermediate layer arranged on the base member and formed of metal, cermet, ceramic, or a composite material of resin and at least one of the metal, the cermet, or the ceramic; and
an erosion-resistant overcoat arranged on the intermediate layer and formed of a spray film having a porosity of 5% or lower,
wherein the intermediate layer includes an intermediate spray film having a higher porosity than that of the spray film forming the erosion-resistant overcoat, and
wherein a ratio of the porosity of the intermediate spray film to the porosity of the spray film forming the erosion-resistant overcoat is 3 or higher.

2. The wind turbine blade according to claim 1,
wherein the intermediate spray film is formed of cermet including at least one of alumina, tungsten carbide, silicon nitride, silicon carbide, zirconia, or chrome carbide or metal including at least one of cobalt alloy, stainless steel, steel, titanium, copper, or aluminum.

3. The wind turbine blade according to claim 1,
wherein the base member has a larger surface roughness Ra at a region which is covered with the intermediate layer and the erosion-resistant overcoat than that at a region which is not covered with the intermediate layer and the erosion-resistant overcoat.

4. The wind turbine blade according to claim 1,
wherein a level difference between a surface of a forming region of the erosion-resistant overcoat of the wind turbine blade and a surface of the wind turbine blade adjacent to the erosion-resistant overcoat outside the forming region is smaller than a total thickness of the erosion-resistant overcoat and the intermediate layer.

5. The wind turbine blade according to claim 1,
wherein a surface of the base member in a forming region of the erosion-resistant overcoat of the wind turbine blade is lowered with respect to a surface of the base member outside the forming region.

6. The wind turbine blade according to claim 4, further comprising a slope member arranged on the base member as being adjacent to the erosion-resistant overcoat, the slope member having thickness decreasing as being apart from a boundary with a forming region of the erosion-resistant overcoat,
wherein the level difference is lessened by the slope member.

7. The wind turbine blade according to claim 1,
wherein the intermediate layer and the erosion-resistant overcoat are formed on a surface of the base member having the blade shape at least at a region on a blade distal end side and/or a region on a leading edge side of the wind turbine blade.

8. The wind turbine blade according to claim 1,
wherein the spray film forming the erosion-resistant overcoat is formed of cobalt alloy or cermet including at least one of alumina, tungsten carbide, silicon nitride, silicon carbide, zirconia, or chrome carbide.

9. A wind turbine blade comprising:
a base member formed of FRP and having a blade shape;
an intermediate layer arranged on the base member and formed of metal, cermet, ceramic, or a composite material of resin and at least one of the metal, the cermet, or the ceramic; and
an erosion-resistant overcoat arranged on the intermediate layer and formed of a spray film having a porosity of 5% or lower,
wherein
the intermediate layer includes an intermediate spray film having a higher porosity than that of the spray film forming the erosion-resistant overcoat,
the porosity of the spray film forming the erosion-resistant overcoat is 3% or lower, and
the porosity of the intermediate spray film is 6% or higher.

10. A wind turbine blade comprising:
a base member formed of FRP and having a blade shape;
an intermediate layer arranged on the base member and formed of metal, cermet, ceramic, or a composite material of resin and at least one of the metal, the cermet, or the ceramic; and
an erosion-resistant overcoat arranged on the intermediate layer and formed of a spray film having a porosity of 5% or lower,
wherein the intermediate layer includes a metal tape.

11. A method for manufacturing a wind turbine blade, comprising steps of:
forming an intermediate layer formed of metal, cermet, ceramic, or a composite material of resin and at least one of the metal, the cermet, or the ceramic on a base member formed of FRP and having a blade shape; and
forming an erosion-resistant overcoat having a porosity of 5% or less on the intermediate layer with HVOF spraying,
wherein the intermediate layer includes an intermediate spray film having a higher porosity than that of the spray film forming the erosion-resistant overcoat, and
wherein the intermediate layer satisfies at least one of:
a first condition that a ratio of the porosity of the intermediate spray film to the porosity of the spray film forming the erosion-resistant overcoat is 3 or higher, or
a second condition that the porosity of the spray film forming the erosion-resistant overcoat is 3% or lower, and the porosity of the intermediate spray film is 6% or higher.

12. The method for manufacturing a wind turbine blade according to claim 11,
wherein the intermediate layer is formed with atmospheric plasma spraying.

13. The method for manufacturing a wind turbine blade according to claim 11,
wherein the erosion-resistant overcoat is formed at an area larger than an operational area of a spraying device by moving the spraying device relatively to the base member along a blade distal end for a region of the blade distal end of the wind turbine blade and along a blade longitudinal direction of the wind turbine blade for a region of a leading edge of the wind turbine blade.

* * * * *